(12) United States Patent
Matsumoto

(10) Patent No.: US 6,704,983 B2
(45) Date of Patent: Mar. 16, 2004

(54) TURRET TYPE TOOL POST

(75) Inventor: Yusuke Matsumoto, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/225,476

(22) Filed: Aug. 22, 2002

(65) Prior Publication Data

US 2003/0046799 A1 Mar. 13, 2003

(30) Foreign Application Priority Data

Aug. 30, 2001 (JP) ........................................ 2000-261257

(51) Int. Cl.$^7$ ............................................. B23B 39/20
(52) U.S. Cl. ...................... 29/40; 42/48.5 R; 42/48.5 A; 74/813 L
(58) Field of Search .................... 29/39, 40, 42, 29/48.5 R, 48.5 A, 49, 33 J; 74/813 R, 813 L, 822; 82/159

(56) References Cited

U.S. PATENT DOCUMENTS

| | | | | |
|---|---|---|---|---|
| 4,656,708 A | * | 4/1987 | Smith et al. .................... | 29/40 |
| 4,872,244 A | * | 10/1989 | Schleich ......................... | 29/40 |
| 5,161,290 A | * | 11/1992 | Hashimoto et al. ............. | 29/40 |
| 5,178,040 A | * | 1/1993 | Schmidt ..................... | 74/813 L |
| 5,455,993 A | * | 10/1995 | Link et al. ...................... | 29/40 |
| 5,490,307 A | * | 2/1996 | Link .............................. | 29/40 |
| 5,632,075 A | * | 5/1997 | De Bernardi et al. ........... | 29/40 |
| 2001/0039706 A1 | * | 11/2001 | Sheehan et al. ................ | 29/40 |

FOREIGN PATENT DOCUMENTS

| | | | |
|---|---|---|---|
| EP | 214090 A1 | * | 3/1987 |
| GB | 2126134 A | * | 3/1984 |
| GB | 2275631 A | * | 9/1994 |
| JP | 55-157407 A | * | 12/1980 |
| JP | 6-743 A | * | 1/1994 |
| JP | 8-290310 A | * | 11/1996 |
| JP | 9-174312 A | * | 7/1997 |
| JP | 11-347814 A | * | 12/1999 |

OTHER PUBLICATIONS

Patent Abstracts of Japan, Publication No. 55–157407 dated Dec. 8, 1980.
Patent Abstracts of Japan, Publication No. 09–174312 dated Jul. 8, 1997.
Patent Abstracts of Japan, Publication No. 59–030604 dated Feb. 18, 1994.
Patent Abstracts of Japan, Publication No. 11–347814 dated Dec. 21, 1999.
Patent Abstracts of Japan, Publication No. 06–000743 dated Jan. 11, 1994.
Patent Abstracts of Japan, Publication No. 08–290310 dated Nov. 5, 1996.

* cited by examiner

*Primary Examiner*—Erica Cadugan
(74) *Attorney, Agent, or Firm*—Westerman, Hattori, Daniels & Adrian, LLP

(57) ABSTRACT

A turret type tool post 1 includes a tool post body 10, a turret 11, a first drive shaft 14, an indexing drive mechanism 20 having a third drive shaft 21, a tool rotation drive mechanism 30 having a second drive shaft 31, a power transmission switching mechanism 40 having a hollow piston 42 and a hollow switching shaft 44 rotatably held in the piston 42, etc. When the piston 42 is moved to one side, the second drive shaft 31 is inserted into the switching shaft 44 in engagement, allowing rotational power to be transmitted to the second drive shaft 31. When the piston 42 is moved to the other side, gears 44*a* of the switching shaft 44 and the third drive shaft 21 are mated with each other, allowing rotational power to be transmitted to the third drive shaft 21.

2 Claims, 4 Drawing Sheets

F I G. 2
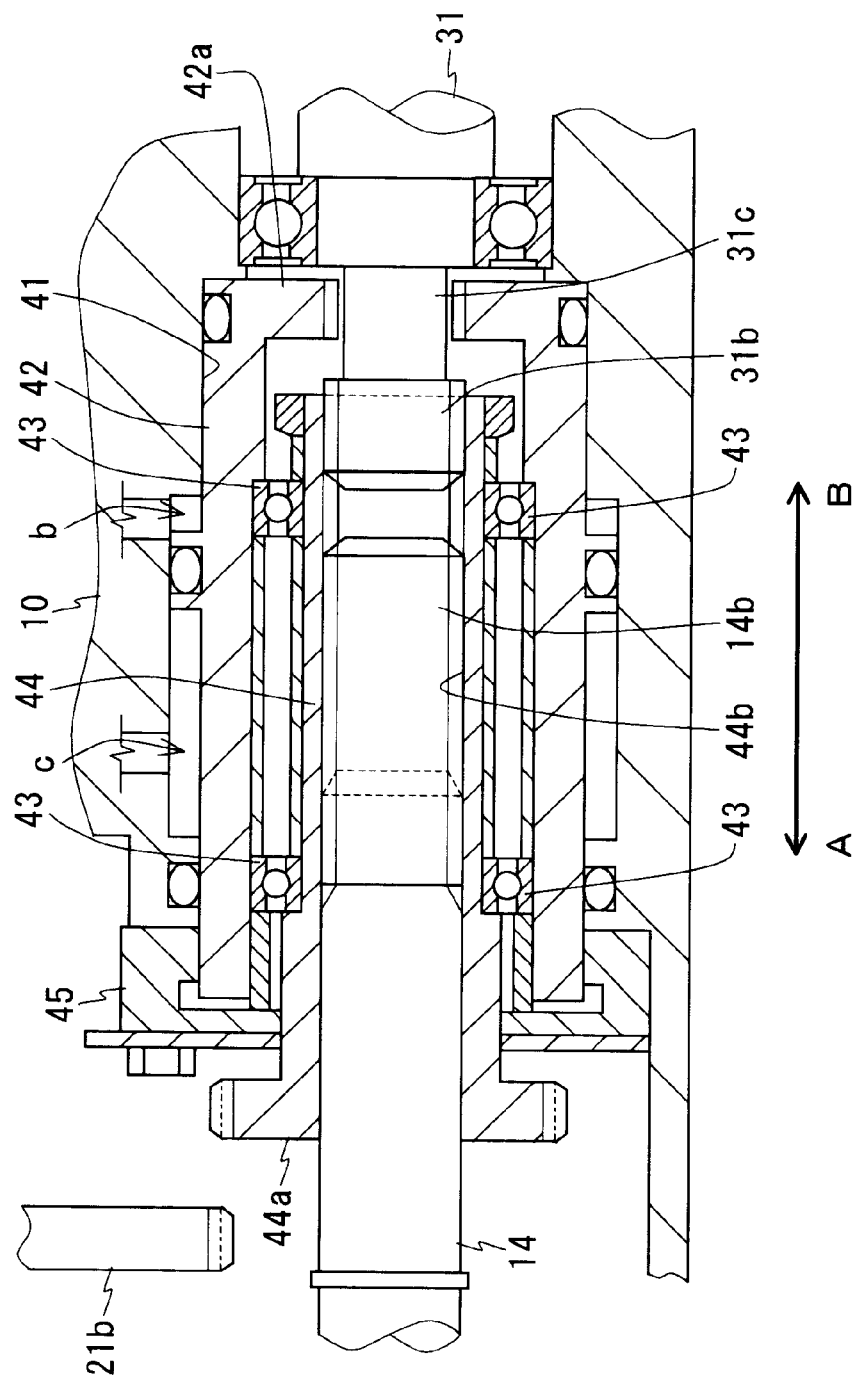

TURRET TYPE TOOL POST

BACKGROUND OF THE INVENTION

1. Field of the Invention

The present invention relates to a turret type tool post for lathes and, more specifically, to a turret type tool post which is so constructed that a turret and rotating tools mounted on the turret are driven by a common drive motor.

2. Description of the Prior Art

For implementation of a plurality of types of machining such as facing and drilling on a workpiece, there has conventionally been used a combined-machining lathe capable of performing a plurality of types of machining with one-time chucking in terms of machining efficiency. As a turret type tool post disposable in such combined-machining lathes, there is known, for example, a turret type tool post disclosed in examined Japanese Patent Publication No. 58-33043 (unexamined Japanese Patent Publication No. 55-157407).

In this turret type tool post, both its tool-spindle-rotation drive mechanism section and a turret-indexing drive mechanism section are driven by one drive motor. For this purpose, clutches for transmitting/interrupting driving force of the drive motor to the tool-spindle-rotation drive mechanism section and the turret-indexing drive mechanism section are provided for the tool-spindle-rotation drive mechanism section and the turret-indexing drive mechanism section, respectively.

The clutches, to which a tool-spindle clutch lever and a turret clutch lever are connected, respectively, are driven by these tool-spindle clutch lever and turret clutch lever, respectively. The tool-spindle clutch lever and the turret clutch lever are driven by clutch control rods coupled to driving cylinders, respectively. Thus, the tool-spindle clutch lever and the turret clutch lever are driven by the clutch control rods, respectively, which are driven by the driving cylinders, and further the clutches are driven by the tool-spindle clutch lever and the turret clutch lever, by which transmission and interruption of rotational power is fulfilled.

Also, a turret clamping lever for clamping/unclamping the turret is provided so as to be driven by the clutch control rod, as the tool-spindle clutch lever and the turret clutch lever are. The turret is switched between non-rotating state and rotating state by operation of this turret clamping lever.

However, because of its constitution that each of the tool-spindle-rotation drive mechanism section and the turret-indexing drive mechanism section is equipped with a clutch and a clutch lever so that the tool-spindle-rotation drive mechanism section and the turret-indexing drive mechanism section can be driven by one drive motor, the conventional turret device has been complex in rotational-power transmission structure, thus having limitations on downsizing of the device. Further, the structure that the clutch is driven by the clutch lever results in poor transmission efficiency of its driving force, which leads to poorer switching responsivity or possible occurrence of malfunction.

Furthermore, since the clutch lever is normally engaged with each of the clutches that rotate with the drive motor, there is another problem that heat generation or noise is likely to occur to the place of their engagement. This problem largely matters particularly to the tool-spindle-rotation drive mechanism section, which rotates the tool at high-speed.

The present invention having been accomplished in view of these and other problems, an object of the present invention is to provide a turret type tool post which is simple in rotational-power switching and transmitting structure and yet capable of size reduction.

SUMMARY OF THE INVENTION

In order to achieve the above object, according to the present invention, there is provided a turret type tool post comprising: at least one of a tool holder for holding a tool rotatably, the tool holder have a rotating shaft for rotating the tool; a turret for holding the tool holder removably; a tool post body for holding the turret rotatably; an indexing drive mechanism for rotating the turret to index a tool holder which has been mounted on the turret to a machining position; a tool rotation drive mechanism for rotating the rotating shaft of the tool holder indexed to the machining position; a drive motor; a first drive shaft which is to be engaged with an output shaft of the drive motor so as to be rotated by rotational power of the drive motor; and a power transmission switching mechanisms which is to be engaged with the first drive shaft so as to transmit rotational power of the first drive shaft selectively to either the tool rotation drive mechanism or the indexing drive mechanism, wherein the tool rotation drive mechanism includes a second drive shaft disposed coaxial with the first drive shaft;

the indexing drive mechanism includes a third drive shaft having a gear and disposed so as to be spaced at a certain distance from and parallel to the first and second drive shafts;

the power transmission switching mechanism includes a cylinder formed in the tool post body, a hollow piston which is to be inserted into the cylinder and which is movable in an axial direction of the first and second drive shafts, and a hollow switching shaft which is rotatably held within the piston and which has a gear at an outer peripheral portion outside the piston, and wherein the switching shaft is so arranged that the first drive shaft is to be inserted into a hollow portion of the switching shaft, allowing the switching shaft in engagement with the first drive shaft to be rotated integrally along with the first drive shaft, and that when the switching shaft moves in the axial direction along with the piston to one side of the axial direction, the gear of the switching shaft goes out of mating with the gear of the third drive shaft and the second drive shaft is inserted into the hollow portion, allowing the switching shaft in engagement with the second drive shaft to transmit rotational power of the first drive shaft to the second drive shaft, and when the switching shaft moves to the other side of the axial direction, the second drive shaft is withdrawn from the hollow portion so that the switching shaft is disengaged therefrom while the gear of the switching shaft is mated with the gear of the third drive shaft, allowing the switching shaft to transmit rotational power of the first drive shaft to the third drive shaft.

In this turret type tool post, when the piston inserted into the cylinder is moved to the one side by working fluid such as pressure oil, the switching shaft is moved to the one side along with the piston so that its gear goes out of mating with the gear of the third drive shaft while having the second drive shaft inserted into its hollow portion in engagement with this second drive shaft, thus making it possible to transmit rotational power of the first drive shaft to the second drive shaft via the switching shaft. As a result, rotational power of the drive motor is transferred to the tool rotation drive mechanism via the first drive shaft and the switching shaft, and the tool held on the tool holder is rotated and driven by the tool rotation drive mechanism.

On the other hand, when the piston is moved to the other side by the working fluid, the second drive shaft is withdrawn from the hollow portion of the switching shaft so that these second drive shaft and switching shaft are disengaged from each other while the gear of the switching shaft is mated with the gear of the third drive shaft, thus making it possible to transmit rotational power of the first drive shaft to the third drive shaft. As a result, rotational power of the drive motor is transferred to the indexing drive mechanism via the first drive shaft and the switching shaft, and the turret is rotated by the indexing drive mechanism, so that a desired tool holder is indexed to the machining position.

The engagement between the first drive shaft, the switching shaft and the second drive shaft can be fulfilled by a combination of spline shaft and spline hole as an example.

As shown above, in this turret type tool post, either the second drive shaft or the third drive shaft can selectively and switchably be connected to the first drive shaft by moving the switching shaft held within the piston in a direction along the axis of the first and second drive shafts, which are disposed coaxial with each other, by operation of the piston. As a result, rotational power of the drive motor can be transferred switchably either to the second drive shaft or the third drive shaft. Accordingly, as compared with power transmission switching mechanisms involving the use of clutch and clutch lever as in the prior art, the mechanism can be simplified in structure and yet reduced in size.

Also, the switching shaft, which is driven by the piston that holds itself as described above, is free from loss in driving force transmission efficiency during the driving operation, yet high in responsivity and moreover free from possibilities of malfunction. Furthermore, there is no room that such heat generation or noise as has mattered to the prior art example may occur.

In the above-described constitution, the turret type tool post may further comprise locking means for locking rotation of the piston, where the piston has an engaging portion formed therein, the engaging portion serving for, when the piston moves to the other side of the axial direction, engaging with the second drive shaft to hold the second drive shaft non-rotatable.

In this turret type tool post, the piston is locked by the locking means so as to be non-rotatable, and further when the piston is moved to the other side of the axial direction, releasing the engagement between the switching shaft and the second drive shaft, the engaging portion formed in the piston engages with the second drive shaft, holding the second drive shaft non-rotatable. As a result, it becomes implementable to prevent the second drive shaft or the tool held on the tool holder from idly rotating when the engagement between the switching shaft and the second drive shaft is released, and further to securely insert the second drive shaft into the switching shaft, and engage the same therewith, when the piston and the switching shaft are moved to the one side of the axial direction so that the second drive shaft is inserted again into the switching shaft.

BRIEF DESCRIPTION OF THE DRAWINGS

FIG. 2 is an enlarged sectional view showing a power transmission switching mechanism according to the embodiment, where the piston and the switching shaft have moved along a direction of arrow B;

DESCRIPTION OF THE PREFERRED EMBODIMENT

Figure 1:
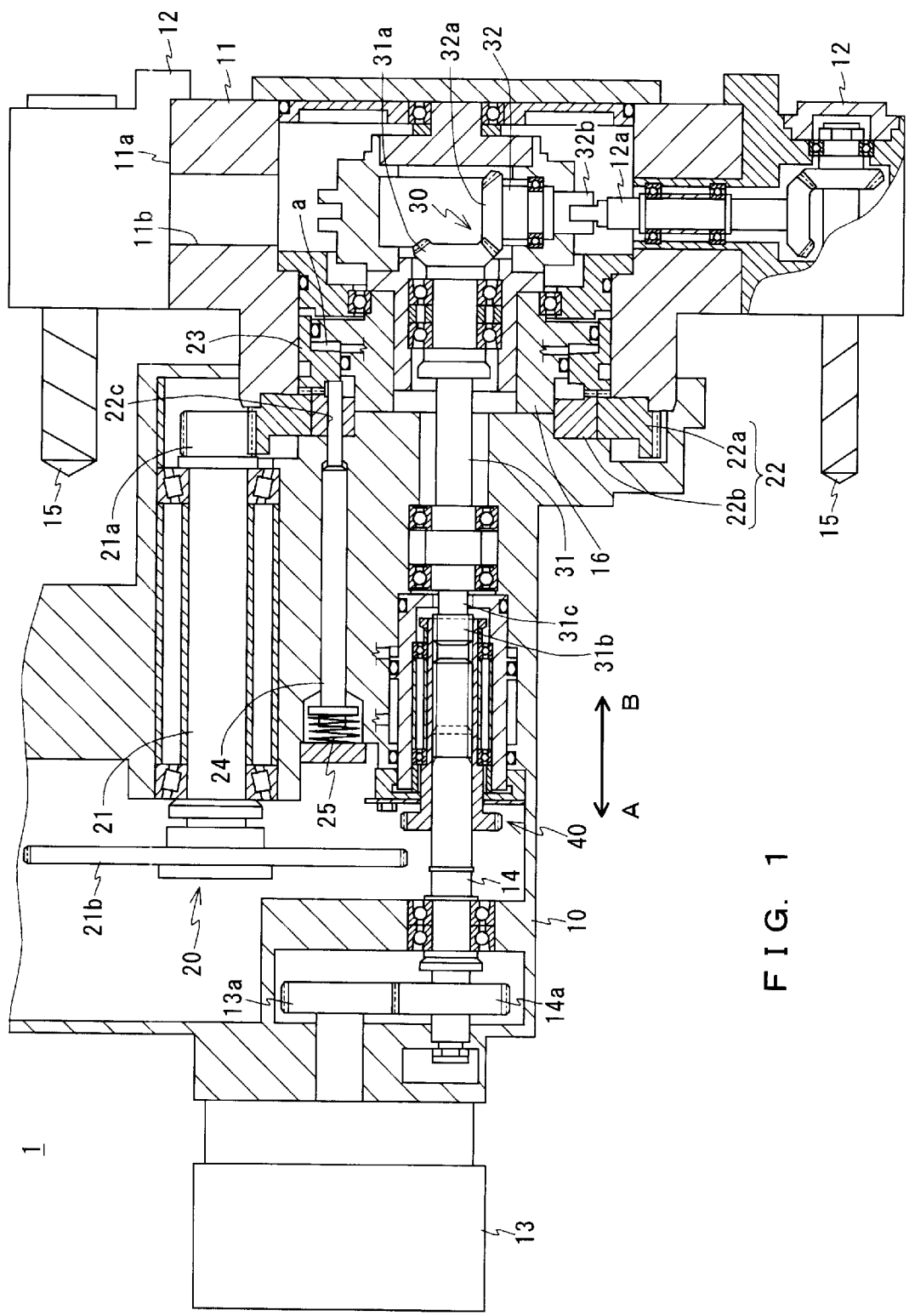
FIG. 1 is a sectional view outlining the structure of a turret type tool post according to an embodiment of the present invention.

Now a preferred embodiment of the present invention is described with reference to the accompanying drawings. FIG. 1 is a sectional view outlining the structure of a turret type tool post according to an embodiment of the present invention.

As shown in FIG. 1, the turret type tool post 1 of this embodiment includes a tool post body 10, a turret 11 rotatably held on the tool post body 10, a tool holder 12 removably held on the turret 11, a drive motor 13, an indexing drive mechanism 20 disposed in the tool post body 10 and the turret 11 and serving for indexing the tool holder 12 to a machining position, a tool rotation drive mechanism 30 for rotating a tool 15 held on the tool holder 12, a first drive shaft 14 which is rotated with rotational power of the drive motor 13, and a power transmission switching mechanism 40 for transmitting the rotational power of the first drive shaft 14 selectively to the indexing drive mechanism 20 or the tool rotation drive mechanism 30.

The drive motor 13 is provided at an end portion of the tool post body 10, and has a transmission gear 13a fixed to its output shaft. Also, the first drive shaft 14 is provided within the tool post body 10 and rotatably held by a bearing, where a transmission gear 14a mated with the transmission gear 13a of the drive motor 13 is provided at one end portion of the first drive shaft 14 while a spline is formed at the other end. Thus, rotational power outputted from the output shaft of the drive motor 13 is transmitted to the first drive shaft 14 via the transmission gears 13a, 14a.

The turret 11 is formed of a polygonal columnar shaped member so that the tool holder 12 can be mounted on its outer circumferential surface 11a or the like. The tool holder 12 is available in two types, i.e., one that the tool holder 12 holds the tool 15 fixed and the other that the tool holder 12 holds the tool 15 rotatable. The latter type of tool holder 12, as shown in the figure, is equipped with a rotating shaft 12a and fitted to a fitting hole 11b ranging from the outer circumferential surface 11a of the turret 11 to its inner circumferential surface, and serves for rotating the tool 15 by the rotating shaft 12a.

The indexing drive mechanism 20 is comprised of a third drive shaft 21 having gears 21a, 21b provided at both end portions and rotatably supported by a bearing, a first curvic coupling 22 and a second curvic coupling 23 which are formed into an annular shape and placed so as to face each other, an unclamping rod 24 and spring member 25 for biasing the second curvic coupling 23 toward the direction of arrow B, and the like.

The first curvic coupling 22 is composed of two members, an outer annular member 22a and an inner annular member 22b, whose end surfaces facing the second curvic coupling 23 (i.e., their end surfaces on the arrow B direction side) are toothed, where the outer annular member 22a is fixed to the turret 11 and the inner annular member 22b is fixed to the tool post body 10, the outer annular member 22a being rotatable relative to the inner annular member 22b.

The outer circumferential surface of the outer annular member 22a is also toothed, and these teeth are mated with the gear 21a provided at the end portion of the third drive shaft 21. Then, under such a mating relation, the outer annular member 22a is driven into rotation by rotation of the third drive shaft 21, so that the turret 11 with the outer annular member 22a fixed thereto is rotated relative to the tool post body 10.

The inner annular member 22b has a through hole 22c for allowing the unclamping rod 24 to be inserted therethrough. It is noted that this through hole 22c, the unclamping rod 24 and the spring member 25 are disposed at, for example, circumferentially equidistant three places so that the second curvic coupling 23 can be biased in the direction of arrow B with uniform force.

The second curvic coupling 23, whose end surface facing the first curvic coupling 22 (i.e., its end surface on the arrow A direction side) is toothed, is held within the turret 11 so as to be movable in the arrow A-B direction. Also, between the second curvic coupling 23 and a bearing housing 16 fixed to one end surface of the tool post body 10 on the arrow-B direction side is defined a hydraulic chamber 'a', where pressure oil is supplied, as necessary, from an oil-pressure supply source (not shown) to this hydraulic chamber 'a'.

Thus, when pressure oil is supplied to the hydraulic chamber 'a', the second curvic coupling 23 is moved by the action of the pressure oil in the direction of arrow A against the biasing force of the spring member 25 and the unclamping rod 24 in the direction of arrow B, so that the teeth of the first curvic coupling 22 and the teeth of the second curvic coupling 23 are mated to each other, causing the turret 11 to be positioned with respect to the tool post body 10 and clamped non-rotatable. On the other hand, when the supply of pressure oil to the hydraulic chamber 'a' is halted, the second curvic coupling 23 is moved in the direction of arrow B by the biasing force of the spring member 25 and the unclamping rod 24, so that the first curvic coupling 22 and the second curvic coupling 23 are released from mating with each other, causing the turret 11 to be free to rotate.

The tool rotation drive mechanism 30, which is disposed coaxial with the first drive shaft 14, is comprised of a second drive shaft 31 rotatably held by a bearing, a rotation drive shaft 32 engaged to the rotating shaft 12a of the tool holder 12 and rotatably held by a bearing, and the like.

In the second drive shaft 31, a spline 31b is formed at its one end portion on the arrow A direction side and a groove 31c is formed right adjacent to the spline 31b, while a bevel gear 31a is provided at its one end portion on the arrow B direction side. In the rotation drive shaft 32, a bevel gear 32a to be mated with the bevel gear 31a of the second drive shaft 31 is provided at its one end portion, while an engaging groove 32b to engage with the rotating shaft 12a of the tool holder 12 is formed at the other end portion.

Thus, when the second drive shaft 31 is rotated, the rotation drive shaft 32 is rotated by the mating relation between the bevel gear 31a of the second drive shaft 31 and the bevel gear 32a of the rotation drive shaft 32, so that the rotating shaft 12a of the tool holder 12 engaged with the engaging groove 32b of the rotation drive shaft 32 is rotated.

The power transmission switching mechanism 40, as shown in FIG. 2, is comprised of a cylinder 41 formed in the tool post body 10, a hollow piston 42 inserted into this cylinder 41, a hollow switching shaft 44 rotatably held in the hollow piston 42 by a bearing 43, and the like. It is noted that FIG. 2 is a sectional view detailing the power transmission switching mechanism 40 of the this embodiment.

In the piston 42, an engaging portion 42a having a spline hole to engage with the spline 31b of the second drive shaft 31 is formed at its one end portion on the arrow B direction side, while a detent 45 is fixed at its one end portion on the arrow A direction side, thus the piston 42 being movable in the arrow A-B direction within the cylinder 41, i.e., along the axis of the first drive shaft 14 and the axis of the second drive shaft 31. It is noted that the detent 45 is restricted in rotation by appropriate means.

Also, hydraulic chambers 'b', 'c' are defined between the inner circumferential surface of the cylinder 41 and the outer circumferential surface of the piston 42. Each of the hydraulic chambers 'b', 'c' is so arranged as to be selectively supplied with pressure oil from appropriate pressure oil supply source (not shown). When pressure oil is supplied to the hydraulic chamber 'b', the piston 42 is moved in the direction of arrow A along with the switching shaft 44. When pressure oil is supplied to the hydraulic chamber 'c', the piston 42 and the switching shaft 44 are moved in the direction of arrow B.

Figure 3:
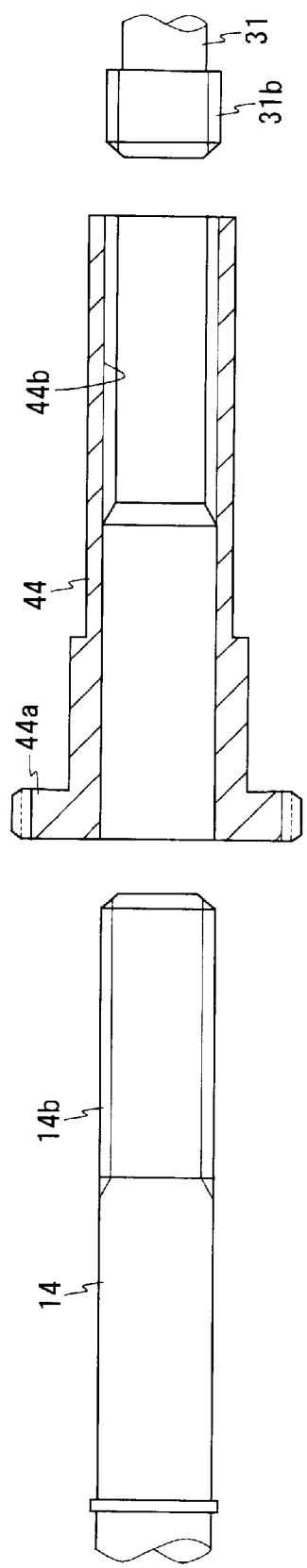
FIG. 3 is an explanatory view showing a state before a first drive shaft and a second drive shaft are inserted into the switching shaft according to the embodiment.

As shown in FIG. 3, the switching shaft 44 has a gear 44a provided at its one end portion on the arrow A direction side, while a spline hole 44b is formed at its one end portion on the arrow B direction side of the center hole. Into this spline hole 44b, a spline 14b of the first drive shaft 14 is to be inserted from the left side as viewed in the figure, and the spline 31b of the second drive shaft 31 is to be inserted from the right side, so as to be engaged to each other. It is noted that FIG. 3 is an explanatory view showing a state before the first drive shaft 14 and the second drive shaft 31 are inserted into the switching shaft 44 of this embodiment.

Figure 4:
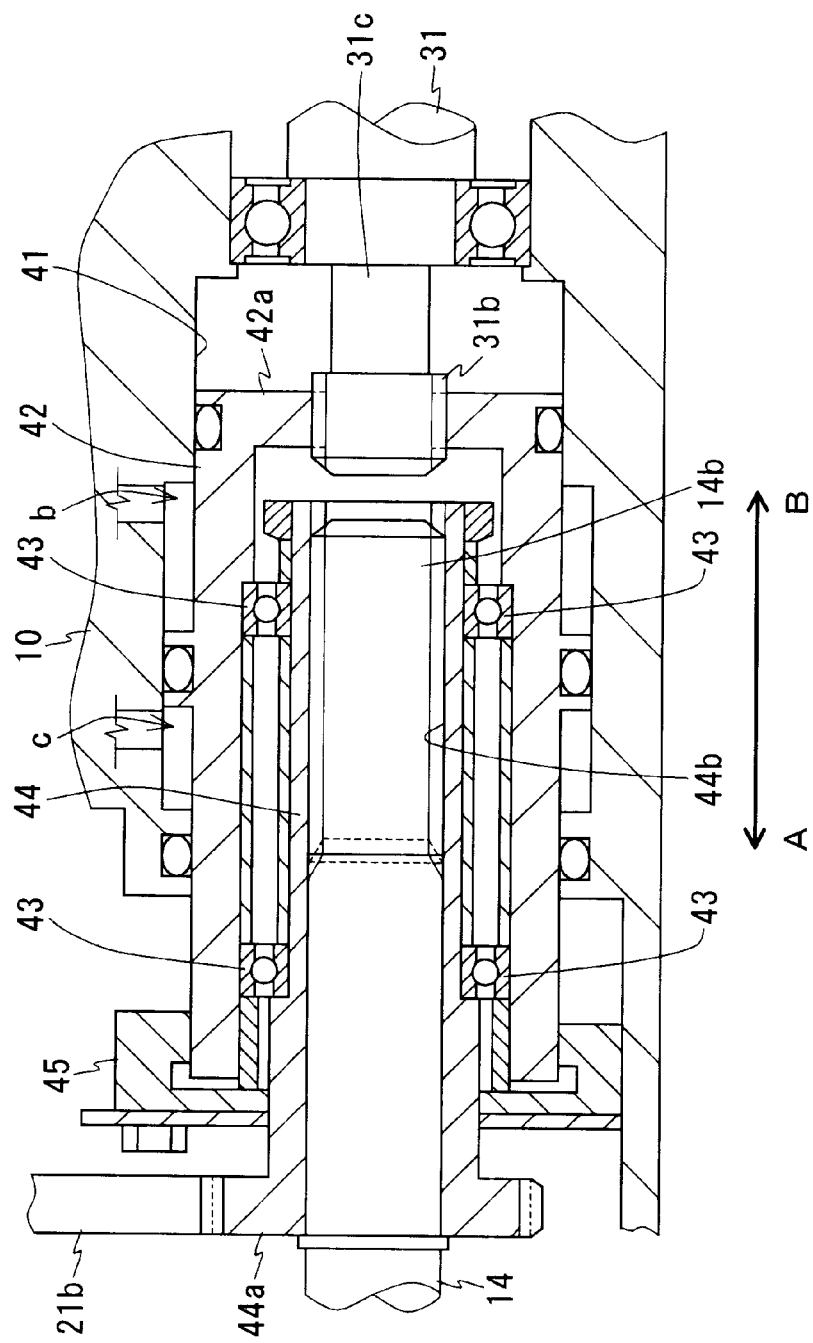
FIG. 4 is an enlarged sectional view showing the power transmission switching mechanism according to the embodiment, where the piston and the switching shaft have moved along a direction of arrow A.

Thus, when pressure oil is supplied to the hydraulic chamber 'b', the piston 42 and the switching shaft 44 are moved in the direction of arrow A, so that as shown in FIG. 4, the spline hole 44b of the switching shaft 44 and the spline 31b of the second drive shaft 31 are disengaged from each other, while the engaging portion 42a is engaged with the spline 31b, making the second drive shaft 31 held non-rotatable, and further the gear 44a is mated with the gear 21b of the third drive shaft 21. In this way, rotational power of the first drive shaft 14 is transmitted to the third drive shaft 21 via the switching shaft 44. It is noted that FIG. 4 is an explanatory view showing a state in which the piston 42 and the switching shaft 44 of this embodiment have moved in the direction of arrow A.

On the other hand, when pressure oil is supplied to the hydraulic chamber 'c', the piston 42 and the switching shaft 44 are moved in the direction of arrow B, so that as shown in FIG. 2, the spline 31b of the second drive shaft 31 is inserted into the spline hole 44b of the switching shaft 44, making the first drive shaft 14, the switching shaft 44 and the second drive shaft 31 to be engaged with one another, while the engaging portion 42a of the piston 42 is positioned within the groove 31c of the second drive shaft 31, so that the engaging portion 42a and the spline 31b of the second drive shaft 31 are disengaged from each other, and further the gear 44a and the gear 21b are released from mating with each other. In this way, rotational power of the first drive shaft 14 is transmitted to the second drive shaft 31 via the switching shaft 44.

In addition, the drive motor 13 is equipped with an encoder (not shown) so that rotational angle position of the drive motor 13 can be controlled according to a signal derived from the encoder. This enables the indexing of the turret 11 to a desired angle, as well as the positioning of the first drive shaft 14, the switching shaft 44 and the second drive shaft 31 to such rotational angle positions that the spline 31b of the second drive shaft 31 and the engaging portion 42a of the piston 42 become engageable with each other, and that the gear 21b of the third drive shaft 21 and the gear 44a of the switching shaft 44 become to be able to mate with each other.

Next, operation of the turret type tool post 1 in this embodiment having the above constitution is described. It is assumed that individual sections of the turret type tool post 1 are in a state shown in FIGS. 1 and 2 at the beginning, where the hydraulic chambers 'a' and 'b' are each supplied with pressure oil.

First, at an end of machining with a tool 15 in a current machining position, the turret type tool post 1 is driven and controlled so that the drive motor 13 therefor comes to such a rotational angle position as to allow the fulfilment of the engagement between the engaging portion 42a of the piston 42 and the spline 31b of the second drive shaft 31 as well as the mating between the gear 44a of the switching shaft 44 and the gear 21b of the third drive shaft, the drive motor 13 being then halted.

Then, when pressure oil is supplied to the hydraulic chamber 'b', the piston 42 and the switching shaft 44 are moved in the direction of arrow A, so that as shown in FIG. 4, the spline hole 44b of the switching shaft 44 and the spline 31b of the second drive shaft 31 are disengaged from each other, while the engaging portion 42a and the spline 31b are engaged with each other, and the gear 44a and the gear 21b are mated with each other. As a result, the second drive shaft 31 is held non-rotatable by the piston 42, while the rotational power of the drive motor 13 is transferable to the third drive shaft 21 via the first drive shaft 14 and the switching shaft 44.

Next, the supply of pressure oil to the hydraulic chamber 'a' is halted. As a result, the second curvic coupling 23 is moved in the direction of arrow B by the biasing force of the spring member 25 and the unclamping rod 24 in the direction of arrow B, so that the first curvic coupling 22 and the second curvic coupling 23 are released from mating with each other, causing the turret 11 to become rotatable.

Thereafter, the drive motor 13 is driven, so that its rotational power is transferred to the outer annular member 22a of the first curvic coupling 22 via the first drive shaft 14, the switching shaft 44 and the third drive shaft 21, so that the outer annular member 22a is driven into rotation. As a result, the turret 11 is rotated, by which the tool holder 12 holding a desired tool 15 is indexed to the machining position.

Upon completion of the indexing of the tool holder 12 to the machining position in this way, pressure oil is then supplied to the hydraulic chamber 'a', so that the second curvic coupling 23 is moved in the direction of arrow A against the biasing force of the spring member 25 and the unclamping rod 24 in the direction of arrow B. As a result, the teeth of the first curvic coupling 22 and the teeth of the second curvic coupling 23 are mated with each other, causing the turret 11 to be positioned with respect to the tool post body 10 and clamped non-rotatable. It is noted that at the time of indexing completion, the switching shaft 44 is at such an angle position that its spline hole 44b and the spline 31b of the second drive shaft 31 can be engaged with each other without any difficulty.

Then, pressure oil is supplied to the hydraulic chamber 'c', so that the piston 42 and the switching shaft 44 are moved in the direction of arrow B, resulting again in the state shown in FIGS. 1 and 2. That is, the engagement between the engaging portion 42a and the spline 31b as well as the mating between the gear 44a and the gear 21b are released, while the spline 31b is inserted into the spline hole 44b in engagement. As a result, rotational power of the drive motor 13 is transferable to the rotating shaft 12a via the first drive shaft 14, the switching shaft 44, the second drive shaft 31 and the rotation drive shaft 32.

Thereafter, the drive motor 13 is driven, so that its rotational power is transferred to the rotating shaft 12a via the first drive shaft 14, the switching shaft 44, the second drive shaft 31 and the rotation drive shaft 32, so that the tool 15 is rotated. After this onward, the workpiece is machined by the tool 15 as required.

As described in detail above, with the use of the turret type tool post 1 of this embodiment, the switching shaft 44 held in the piston 42 is moved by operation of the piston 42 in a direction along the axis of the first drive shaft 14 and the second drive shaft 31, which are disposed coaxial with each other, so that the second drive shaft 31 and the third drive shaft 21 can be connected selectively and switchably to the first drive shaft 14. As a result of this, rotational power of the drive motor 13 can be transferred switchably to either the second drive shaft 31 or the third drive shaft 21. Accordingly, as compared with power transmission switching mechanisms involving the use of clutch and clutch lever as in the prior art, the mechanism can be simplified in structure and yet reduced in size.

Also, the switching shaft 44, which is driven by the piston 42 that holds itself as described above, is free from loss in driving force transmission efficiency during the driving operation, yet high in responsivity and moreover free from possibilities of malfunction. Furthermore, there is no room that such heat generation or noise as has mattered to the prior art example may occur.

Also, when the piston 42 and the switching shaft 44 are moved in the direction of arrow A, releasing the engagement between the spline hole 44b of the switching shaft 44 and the spline 31b of the second drive shaft 31, the engaging portion 42a of the piston 42 is engaged with the spline 31b, so that the second drive shaft 31 is held non-rotatable. Accordingly, upon release of the engagement between the switching shaft 44 and the second drive shaft 31, the tool 15 held by the second drive shaft 31 or the tool holder 12 can be prevented from idly rotating. Moreover, for re-insertion of the second drive shaft 31 into the switching shaft 44, the second drive shaft 31 can securely be inserted into, and engaged with, the switching shaft 44.

Although the present invention has been fully described with respect to one embodiment thereof, actual modes in which the present invention is carried out are in no sense limited to this.

What is claimed is:

1. A turret type tool post comprising: at least one tool holder for holding a tool rotatably, the at least one tool holder having a rotating shaft for rotating the tool; a turret for holding the at least one tool holder removably; a tool post body for holding the turret rotatably; an indexing drive mechanism for rotating the turret to index a tool holder which has been mounted on the turret to a machining position; a tool rotation drive mechanism for rotating the rotating shaft of the tool holder indexed to the machining position; a drive motor; a first drive shaft which is to be engaged with an output shaft of the drive motor so as to be rotated by rotational power of the drive motor; and a power transmission switching mechanism which is to be engaged with the first drive shaft so as to transmit rotational power of the first drive shaft selectively to either the tool rotation drive mechanism or the indexing drive mechanism, wherein the tool rotation drive mechanism includes a second drive shaft disposed coaxial with the first drive shaft;

the indexing drive mechanism includes a third drive shaft having a gear and disposed so as to be spaced at a certain distance from and parallel to the first and second drive shafts;

the power transmission switching mechanism includes a cylinder formed in the tool post body, a hollow piston which is to be inserted into the cylinder and which is movable in an axial direction of the first and second drive shafts, and a hollow switching shaft which is rotatably held within the piston and which has a gear at an outer peripheral portion outside the piston, and wherein the switching shaft is so arranged that the first drive shaft is to be inserted into a hollow portion of the switching shaft, allowing the switching shaft in engagement with the first drive shaft to be rotated integrally along with the first drive shaft, and that when the switching shaft moves in the axial direction along with the piston to one side of the axial direction, the gear of the switching shaft goes out of mating with the gear of the third drive shaft and the second drive shaft is inserted into the hollow portion, allowing the switching shaft in engagement with the second drive shaft to transmit rotational power of the first drive shaft to the second drive shaft, and when the switching shaft moves to the other side of the axial direction, the second drive shaft is withdrawn from the hollow portion so that the switching shaft is disengaged therefrom while the gear of the switching shaft is mated with the gear of the third drive shaft, allowing the switching shaft to transmit rotational power of the first drive shaft to the third drive shaft, and wherein the piston has an engaging portion formed therein, the engaging portion serving for, when the piston moves to the said other side of the axial direction, engaging with the second drive shaft to hold the second drive shaft non-rotatable.

2. The turret type tool post as set forth in claim 1, further comprising locking means for locking rotation of the piston.

* * * * *